US008537850B2

(12) United States Patent
Qin et al.

(10) Patent No.: US 8,537,850 B2
(45) Date of Patent: Sep. 17, 2013

(54) METHOD AND SYSTEM FOR DIRECTIONAL VIRTUAL SENSING RANDOM ACCESS FOR WIRELESS NETWORKS (75) Inventors: Xiangping Qin, Carbondale, IL (US); Chiu Ngo, San Francisco, CA (US); Harkirat Singh, Santa Clara, CA (US); Huai-Rong Shao, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 866 days.

(21) Appl. No.: 12/348,817

(22) Filed: Jan. 5, 2009

(65) Prior Publication Data

US 2010/0014489 A1  Jan. 21, 2010

Related U.S. Application Data (60) Provisional application No. 61/082,079, filed on Jul. 18, 2008.

(51) Int. Cl.
*H04L 12/413* (2006.01)
(52) U.S. Cl.
USPC ............................ 370/445; 370/329; 370/468
(58) Field of Classification Search
USPC .......................................... 370/329, 445, 468
See application file for complete search history.

(56) References Cited

U.S. PATENT DOCUMENTS

| | | | |
|---|---|---|---|
| 5,592,623 A * | 1/1997 | Kurobe | 709/225 |
| 6,584,116 B1 * | 6/2003 | Gourgue et al. | 370/442 |
| 6,640,087 B2 | 10/2003 | Reed et al. | |
| 7,366,464 B2 | 4/2008 | Iacono et al. | |
| 7,403,488 B2 | 7/2008 | Gu et al. | |
| 7,428,428 B2 * | 9/2008 | Wong et al. | 455/562.1 |
| 7,433,648 B2 | 10/2008 | Bridgelall | |
| 7,508,834 B2 | 3/2009 | Berkman et al. | |
| 7,596,388 B2 * | 9/2009 | Willins et al. | 455/562.1 |
| 7,609,648 B2 * | 10/2009 | Hoffmann et al. | 370/252 |
| 7,675,884 B2 | 3/2010 | Ye | |
| 7,720,036 B2 | 5/2010 | Sadri et al. | |
| 7,889,701 B2 * | 2/2011 | Malik et al. | 370/334 |
| 7,987,415 B2 | 7/2011 | Niu et al. | |
| 8,031,666 B2 * | 10/2011 | Jeon et al. | 370/329 |
| 8,045,484 B2 * | 10/2011 | Peleg et al. | 370/255 |
| 8,054,223 B2 * | 11/2011 | Lakkis | 342/367 |
| 8,170,052 B2 * | 5/2012 | Orfanos et al. | 370/461 |

(Continued)

OTHER PUBLICATIONS

Directional Virtual Carrier Sensing for Directional Antenna in Mobile Ad Hoc Networks: Takai et al. Jun. 9-11, 2002.*

(Continued)

*Primary Examiner* — John Blanton
*Assistant Examiner* — Jay P Patel
(74) *Attorney, Agent, or Firm* — Kenneth L. Sherman, Esq.; Michael Zarrabian, Esq.; Sherman & Zarrabian LLP (57) ABSTRACT

A method and system for wireless communication in a wireless network is provided. One implementation involves a requesting wireless station directionally transmitting a request to a coordinator for access to a communication channel; the request packet includes a field indicating the length of the desired reservation period; and upon successfully receiving the request from the wireless station, the coordinator reserving a channel time period for data transmission by the requesting wireless station, and at least pseudo-omni-directionally broadcasting a packet to all wireless stations in the network indicating the reservation. All other stations refrain from contending the channel during the reserved channel time period.

40 Claims, 7 Drawing Sheets

(56) References Cited

U.S. PATENT DOCUMENTS

| | | | |
|---|---|---|---|
| 8,259,648 B2* | 9/2012 | Pratapagiri | 370/328 |
| 8,314,688 B2* | 11/2012 | Pahlavan et al. | 340/12.51 |
| 2002/0120740 A1* | 8/2002 | Ho et al. | 709/225 |
| 2004/0002357 A1* | 1/2004 | Benveniste | 455/550.1 |
| 2004/0212566 A1* | 10/2004 | Marcotte | 345/60 |
| 2004/0218563 A1* | 11/2004 | Porter et al. | 370/329 |
| 2005/0025131 A1* | 2/2005 | Ko et al. | 370/352 |
| 2005/0037822 A1* | 2/2005 | Regnier et al. | 455/575.5 |
| 2005/0157676 A1* | 7/2005 | Kwak et al. | 370/328 |
| 2005/0239407 A1* | 10/2005 | Foore et al. | 455/63.4 |
| 2006/0164969 A1* | 7/2006 | Malik et al. | 370/203 |
| 2006/0209772 A1* | 9/2006 | Fang et al. | 370/338 |
| 2007/0116033 A1* | 5/2007 | Reunamaki et al. | 370/445 |
| 2007/0240191 A1 | 10/2007 | Singh et al. | |
| 2007/0280184 A1* | 12/2007 | Shin et al. | 370/338 |
| 2008/0019343 A1* | 1/2008 | Benveniste | 370/338 |
| 2008/0095072 A1* | 4/2008 | Shao et al. | 370/254 |
| 2008/0095104 A1 | 4/2008 | Hansen | |
| 2008/0273600 A1 | 11/2008 | Singh et al. | |
| 2009/0109938 A1 | 4/2009 | Singh et al. | |
| 2009/0232103 A1* | 9/2009 | Kesselman et al. | 370/336 |
| 2009/0233635 A1* | 9/2009 | Li et al. | 455/509 |
| 2009/0279448 A1* | 11/2009 | Lakkis | 370/252 |
| 2009/0279525 A1* | 11/2009 | Lakkis | 370/338 |
| 2010/0014502 A1 | 1/2010 | Singh et al. | |

OTHER PUBLICATIONS 802.11™, IEEE Standard for Information technology—Telecommunications and information exchange between systems—Local and metropolitan area networks—Specific requirements, Part 11: Wireless LAN Medium Access Control (MAC)and Physical Layer (PHY) Specifications, Chapters 9.2, 9.3, Jun. 12, 2007, 28 pages.

802.15.3™, IEEE Standard for Information Technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), IEEE Std 802.15.3-2003, IEEE Computer Society, Chapter 8.4.2, Sep. 29, 2003, 5 pages.

"WirelessHD Specification Version 1.0 Overview," chapter 7.6.2, Oct. 9, 2007, 3 pages.

IST Broadway, "A 5/60GHz Hybrid System Concept," 2008, pp. 1-13, IST BroadWay, United States.

Choi, S. et al., "IEEE 802.11e Contention-Based Channel Access (EDCF) Performance Evaluation," Proceedings of the IEEE International Conference on Communications (ICC '03), May 2003, pp. 1151-1156, vol. 2, IEEE, United States.

Draves, R. et al., "Routing in Multi-Radio, Multi-Hop Wireless Mesh Networks," ACM MobiCom '04—The Tenth Annual International Conference on Mobile Computing and Networking, Sep. 26-Oct. 1, 2004, pp. 1-15, ACM, United States.

Courville, M. et al., "Evaluation of Centralized Adhoc Network Architecture (CANA)," BAI Cluster Workshop 2004-03, Jun. 1, 2004, pp. 1-17, IST BroadWay Project, United States.

Heinzelman, W.R. et al., "Energy Efficient Communication Protocol for Wireless Microsensor Networks," Proceedings of the 33rd Annual Hawaii International Conference on System Sciences, Jan. 2000, pp. 1-10, vol. 2, IEEE, United States.

Iannone, L. et al., "Can Multi-rate Radios Reduce End-to-end Delay in Mesh Networks? A Simulation Case Study," Mesh Networking: Realizing the Wireless Internet (Meshnets '05), Jul. 2005, pp. 1-10, Meshnets, Budapest, Hungary.

802.11 Working Group of the 802 Committee, "IEEE P802.11nTM/D3.00 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 4: Enhancements for Higher Throughput," Sep. 2007, pp. i-520, IEEE, United States.

Madhow, U., "MultiGigabit Millimeter Wave Communication: System Concepts and Challenges," Proceedings of the Information Theory and Applications Workshop, Jan. 2008, pp. 193-196, IEEE, United States.

Perahia, E. et al., "Next Generation Wireless LANs: Throughput, Robustness, and Reliability in 802.11n," Sep. 2008, pp. 1-10, Cambridge University Press, Cambridge, United Kingdom.

Ramachandran, K.N. et al., "Interference-Aware Channel Assignment in Multi-Radio Wireless Mesh Networks," Proceedings of the 25th IEEE International Conference on Computer Communications (INFOCOM 2006), Apr. 2006, pp. 1-22, IEEE, United States.

Ros, F.J. et al., "Cluster-based OLSR Extensions to Reduce Control Overhead in Mobile Ad Hoc Networks," International Wireless Communications and Mobile Computing Conference (IWCMC 2007), Aug. 2007, pp. 1-6, ACM, New York, United States.

Villasenor-Gonzalez, L. et al., "HOLSR: A Hierarchical Proactive Routing Mechanism for Mobile Ad Hoc Networks," IEEE Communications Magazine, Jul. 2005, pp. 1-8, vol. 43, No. 7, IEEE, United States.

Hachman, M., "CE Giants Back Amimon's Wireless HDTV Tech," Jul. 23, 2008, p. 1, PC Mag, United States, downloaded from http://www.pcmag.com/article2/0,2817,2326277,00.asp on Feb. 2, 2011.

Hitachi, Ltd. et al., "High-Definition Multimedia Interface (HDMI) Specification Version 1.2," Aug. 22, 2005, pp. 1-214, WirelessHD, LLC, United States.

Maruhashi, K. et al, "Wireless Uncompressed-HDTV-Signal Transmission System Utilizing Compact 60-GHz-band Transmitter and Receiver," Proceedings of the 2005 IEEE MTT-S International Microwave Symposium Digest, Jun. 2005, pp. 1867-1870, IEEE, United States.

Multiband OFDM Alliance, "Distributed Medium Access Control for Wireless Networks—Draft 0.99," Nov. 1, 2005, pp. 1-182, Multiband OFDM Alliance (MBOA) Special Interest Group, United States.

Nikkei Electronics Asia Online, "NEC Develops Compact Millimeter-Wave Transceiver for Uncompressed HDTV Signal Transmission," Apr. 5, 2005, 2 pages, Nikkei Electronics Asia, Japan, downloaded from http://neasia.nikkeibp.com/topstory/000913 on Sep. 29, 2006.

U.S. Restriction Requirement for U.S. Appl. No. 12/357,360 mailed Aug. 17, 2011.

U.S. Non-Final Office Action for U.S. Appl. No. 12/357,360 mailed Dec. 21, 2011.

U.S. Notice of Allowance for U.S. Appl. No. 12/357,360 mailed Jun. 21, 2012.

WirelessHD, LLC, "WirelessHD Specification Revision 0.1," Jul. 12, 2006, pp. i-167, WirelessHD, LLC, United States.

U.S. Notice of Allowance for U.S. Appl. No. 12/357,360 mailed Sep. 11, 2012.

* cited by examiner

METHOD AND SYSTEM FOR DIRECTIONAL VIRTUAL SENSING RANDOM ACCESS FOR WIRELESS NETWORKS

RELATED APPLICATION

This application claims priority from U.S. Provisional Patent Application Ser. No. 61/082,079 filed on Jul. 18, 2008, incorporated herein by reference.

FIELD OF THE INVENTION

The present invention relates to wireless communication, and in particular, to random access wireless communication.

BACKGROUND OF THE INVENTION

In a typical wireless network where a coordination function is utilized for coordinating transmissions among wireless stations, such a coordination function may be implemented in one of the wireless stations or an access point (coordinator). The wireless stations may be consumer electronics (CE) devices which communicate via directional transmissions using sector antennas and beam forming antenna arrays. The coordinator may use omni-directional transmissions (e.g., 360 degrees range) to broadcast to all stations in all directions. Or the coordinator may use quasi-omni-directional transmissions to broadcast to a wide range, but not necessarily 360 degrees. However, when directional transmission is used by two stations to transmit to a coordinator, the two stations may interfere with directional transmissions of each other but cannot hear each other. This prevents carrier sensing for the two stations when attempting random access to a wireless communication medium for communication. When transmissions are directional, preamble sensing is not available. Also the number of transmission opportunities is fixed. This lowers the random access efficiency as well.

BRIEF SUMMARY OF THE INVENTION

The present invention provides a method and system for wireless communication in a wireless network. One embodiment involves a requesting wireless station directionally transmitting a request to a coordinator for access to a communication channel; and upon successfully receiving the request from the wireless station, the coordinator reserving a channel time period for data transmission by the requesting wireless station, and at least pseudo-omni-directionally broadcasting a packet to all wireless stations in the network indicating the reservation.

Said request may comprise a fixed-size request packet transmitted directionally to the coordinator using random access transmission. Said packet may comprise a Channel Busy Indication (CBI) packet broadcast by the coordinator to provide virtual sensing to the wireless stations indicating the time duration the channel is reserved for the requesting wireless station. The coordinator divides the channel in terms of contention time slots, and one slot is long enough to transmit a random access packet and a CBI.

The coordinator may transmit a null CBI packet if no CBI is transmitted for a time period, allowing a wireless station joining the network to detect the coordinator and synchronize with the network. Upon successfully receiving the packet from the coordinator, the wireless station and the coordinator directionally exchange a Medium Access Control (MAC) data packet and a MAC acknowledgement (ACK) for duration of the time period specified by the coordinator. The length of the reservation period may be selected below a threshold to allow fairness in access to the channel by other wireless stations.

These and other features, aspects and advantages of the present invention will become understood with reference to the following description, appended claims and accompanying figures.

DETAILED DESCRIPTION OF THE INVENTION

The present invention provides a method and system for wireless communication in a wireless network including multiple wireless stations. One embodiment involves a requesting wireless station directionally transmitting a request to a coordinator wireless station for access to a shared communication channel. Upon successfully receiving the request from the wireless station, the coordinator reserves a channel time period for data transmission by the requesting wireless station, and at least pseudo-omni-directionally broadcasts a packet to all wireless stations in the network indicating the reservation.

The request comprises a fixed-size request packet transmitted directionally to the coordinator using random access transmission. The packet comprises a Channel Busy Indication (CBI) packet broadcast by the coordinator to provide virtual sensing to the wireless stations indicating the time duration the shared channel is reserved for the requesting wireless station. The coordinator divides the shared channel time in terms of contention time slots, wherein a time slot is long enough to allow transmission of a random access packet and a CBI. The coordinator transmits null CBI packets if no CBI is transmitted for a time period, allowing a wireless station joining the network to detect the coordinator and synchronize with the network. Upon successfully receiving the packet from the coordinator, the wireless station and the coordinator directionally exchange a MAC data packet and a MAC ACK for duration of the time period specified by the coordinator. The length of the reservation period is selected to be below a threshold to allow fairness in access to the channel by other wireless stations.

Figure 1:
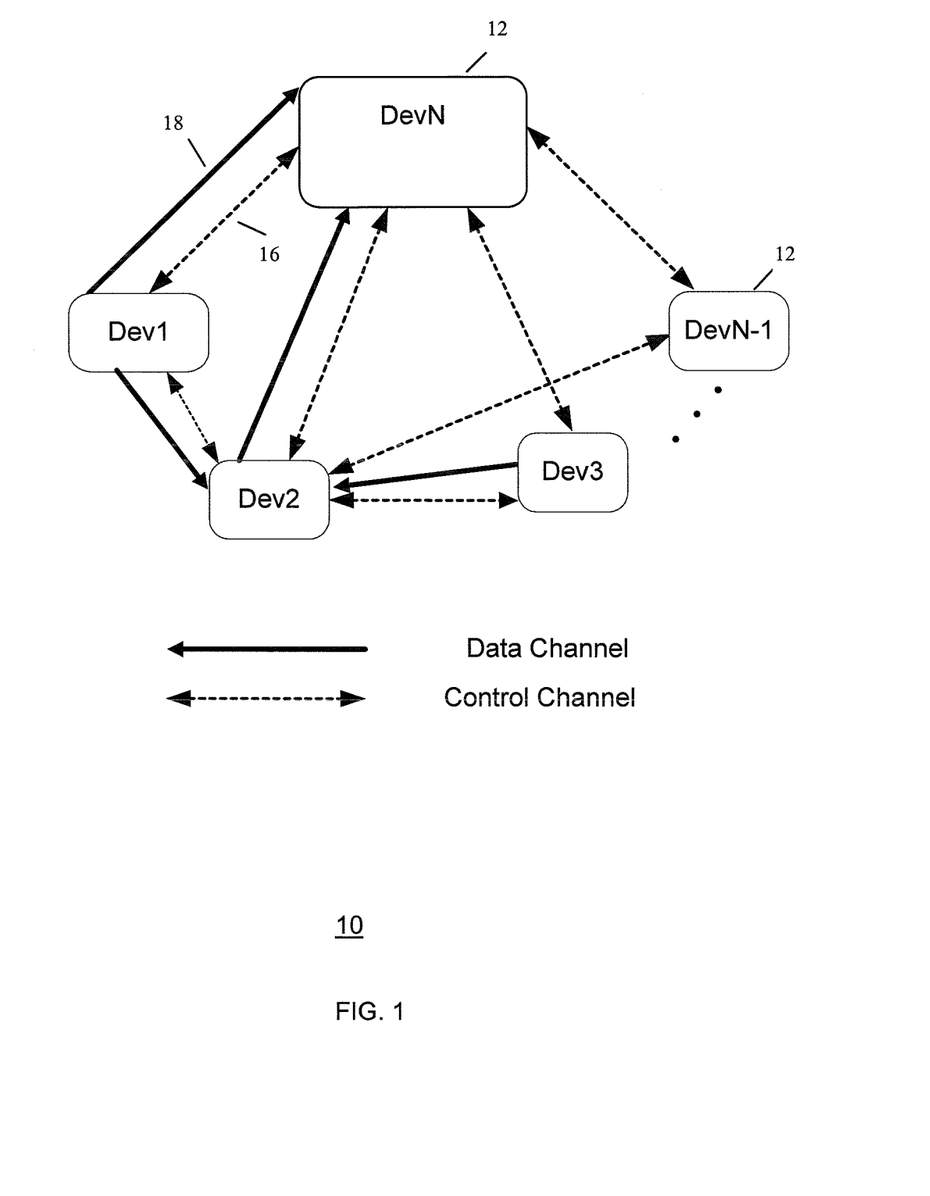
FIG. 1 shows a functional block diagram of a wireless network implementing wireless communication, according to an embodiment of the present invention.

An example implementation is now described. FIG. 1 shows a functional block diagram of a wireless network 10 that may implement wireless communication between N wireless stations 12 (e.g., devices $Dev_1, \ldots, Dev_N$) on a communication channel (e.g., 2.4 GHz or 60 GHz radio frequency channel), according to an embodiment of the present invention. A control channel 16 may be used for control message transmissions to coordinate the transmissions on a data channel 18. Each of the stations 12 can function as an initiator or a responder, wherein a transmission initiator is a station that first initiates transmission and can be a transmission sender or receiver. A transmission responder is a station that responds to the transmission initiator and can be a transmission sender or receiver.

A random access scheme for communication channel access is implemented for the wireless network utilizing directional transmissions. In the example topology shown in FIG. 1, one wireless stations (e.g., $Dev_N$) serves as a coordinator and coordinates the transmissions of all other wireless stations. The stations transmit to the coordinator via random access schemes. The coordinator and the stations utilize directional communication. The coordinator may transmit and receive at a wider range than the stations, for example, the coordinator can transmit and receive omni-directionally or pseudo-omni-directionally.

A frame structure may be used for data transmission between wireless stations. Frame aggregation can be used in a Media Access Control (MAC) layer and a physical (PHY) layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

In this example wireless network where directional transmissions are used, short and fixed-size request packets are transmitted directionally to the coordinator using random access communication via the wireless channel. Upon successful reception, the coordinator (e.g., $Dev_N$) provides virtual sensing by broadcasting a packet to all stations (e.g., $Dev_1, \ldots, Dev_{N-1}$), and reserves a period of time for data transmission.

Directional transmission is used where carrier sensing is not available to all stations. The stations transmit with directional transmissions such as sector antennas or beam forming antenna arrays, etc. The coordinator may use omni-directional transmissions to broadcast to all stations at all directions. Or the coordinator may use quasi-omni transmissions to broadcast to a wide range, but not necessarily 360 degrees.

Figure 2:
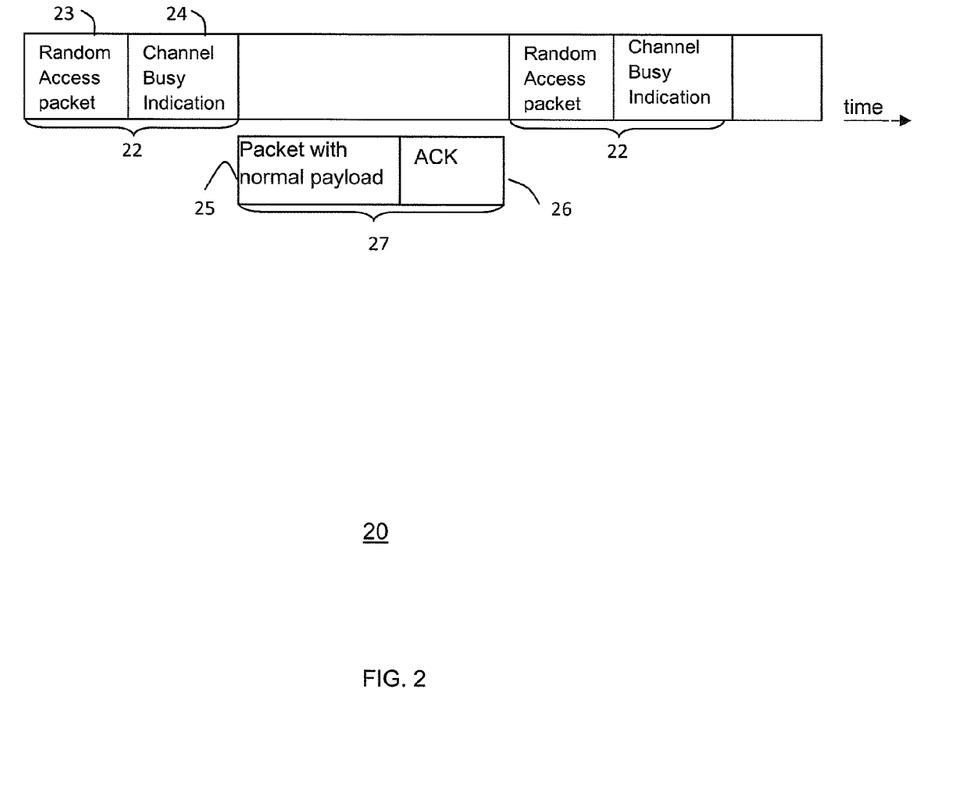
FIG. 2 shows a random access process involving partitioning a shared channel access time, according to an embodiment of the invention.

FIG. 2 shows an example random access timing scheme 20 according to the invention, illustrating how the coordinator divides the channel time in terms of contention time slots 22, wherein a time slot 22 is long enough to allow transmission a random access packet and a CBI. Short slots 22 are used for random access. One slot 22 can accommodate transmissions of one random access packet 23 and a Channel Busy Indication (CBI) packet 24. The random access packet represents a request for access to the channel for data transmission.

If a random access packet 23 is received from a requesting station correctly, the coordinator broadcasts a CBI packet 24. Otherwise no packet is transmitted. FIG. 2 shows after the first slot 22 the random access packet is received correctly. The random access packet 23 is a short packet, including a preamble, a physical layer header and a MAC layer header indicating the length of the time reserved for the requesting station for transmitting the following data packet and ACK sequence 27. The CBI packet 24 is broadcast by the coordinator to all the stations.

After a CBI packet is received at each receiving station, the requesting station which transmitted the random access packet continues to transmit data as a MAC packet 25 with normal payload during a reserved time period indicated in the CBI. After the coordinator receives the random access packet correctly, an acknowledgement (ACK) 26 is transmitted to the requesting station. Other stations defer their transmissions for the reserved time period. After the expiration of the reserved period another random access period begins.

Figure 3:
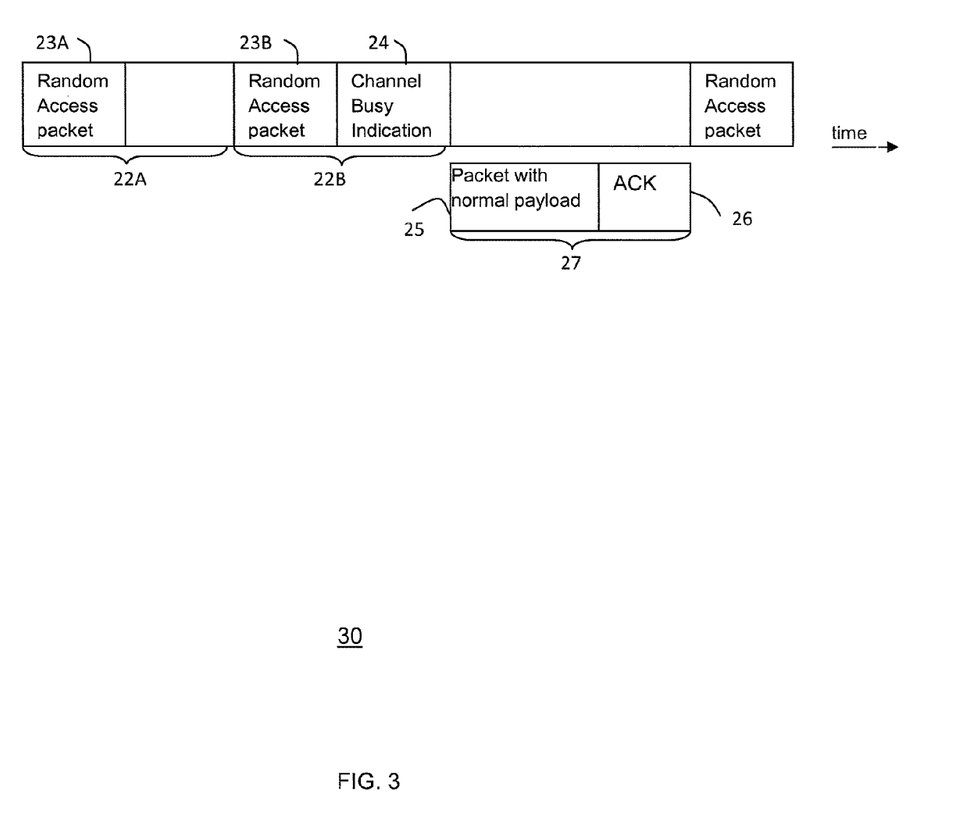
FIG. 3 shows a random access process, according to an embodiment of the invention.

FIG. 3 shows a random access timing scheme 30 wherein in a first slot 22A a random access packet 23A is not received correctly at the coordinator due to collision. However, in a second slot 22B, a random access packet 23B is received correctly at the coordinator and a CBI packet 24 is transmitted by the coordinator. After passage of a busy time period 27 with a duration that is indicated in the CBI packet 24, another random access period 23 begins.

For a reserved transmission period 27 after a CBI 24 (FIG. 2), the length of the transmission is limited by a threshold time T_tr to prevent stations from occupying the channel for an extended period of time. This provides fairness to other stations, wherein T_tr<T_c.

Figure 4:
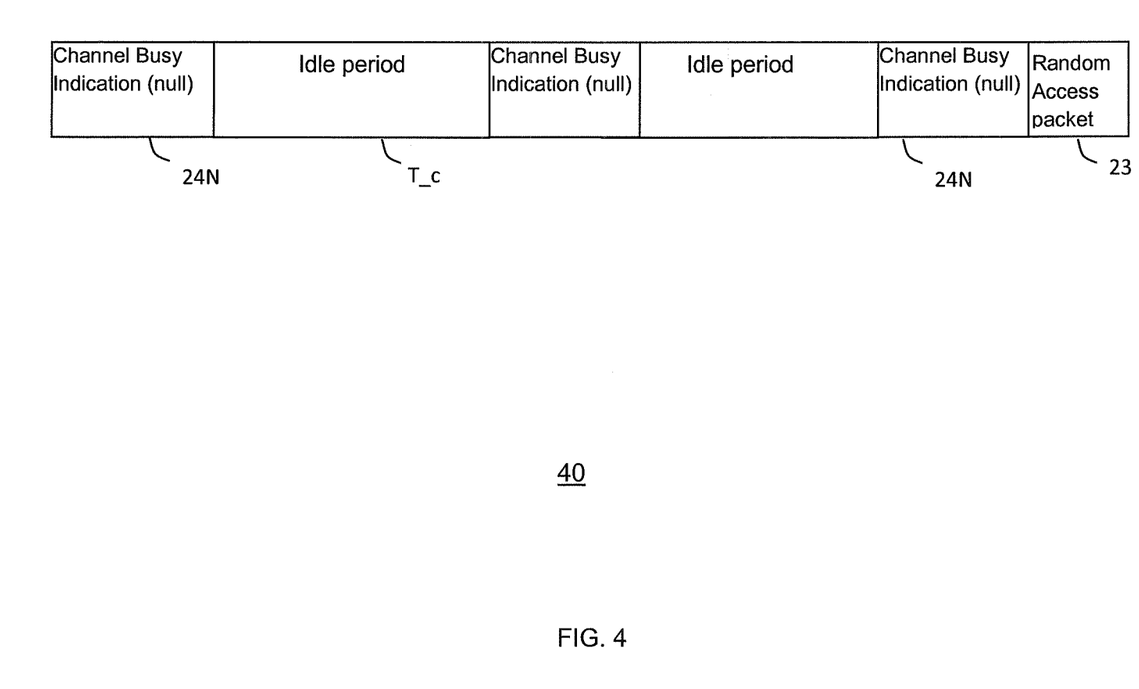
FIG. 4 shows another random access process, according to another embodiment of the invention.

Referring to the example timing diagram 40 in FIG. 4, in order for a new wireless station that enters the network 10 to synchronize with the network, a NULL CBI 24N is broadcast with the duration of the busy time in the CBI set to 0 if the channel is idle for a certain amount of time T_c. After the NULL CBI, another random access period 23 begins to allow stations to send a random access packet to the coordinator. A new station listens to the channel to search for a CBI packet before transmitting.

Figure 5:
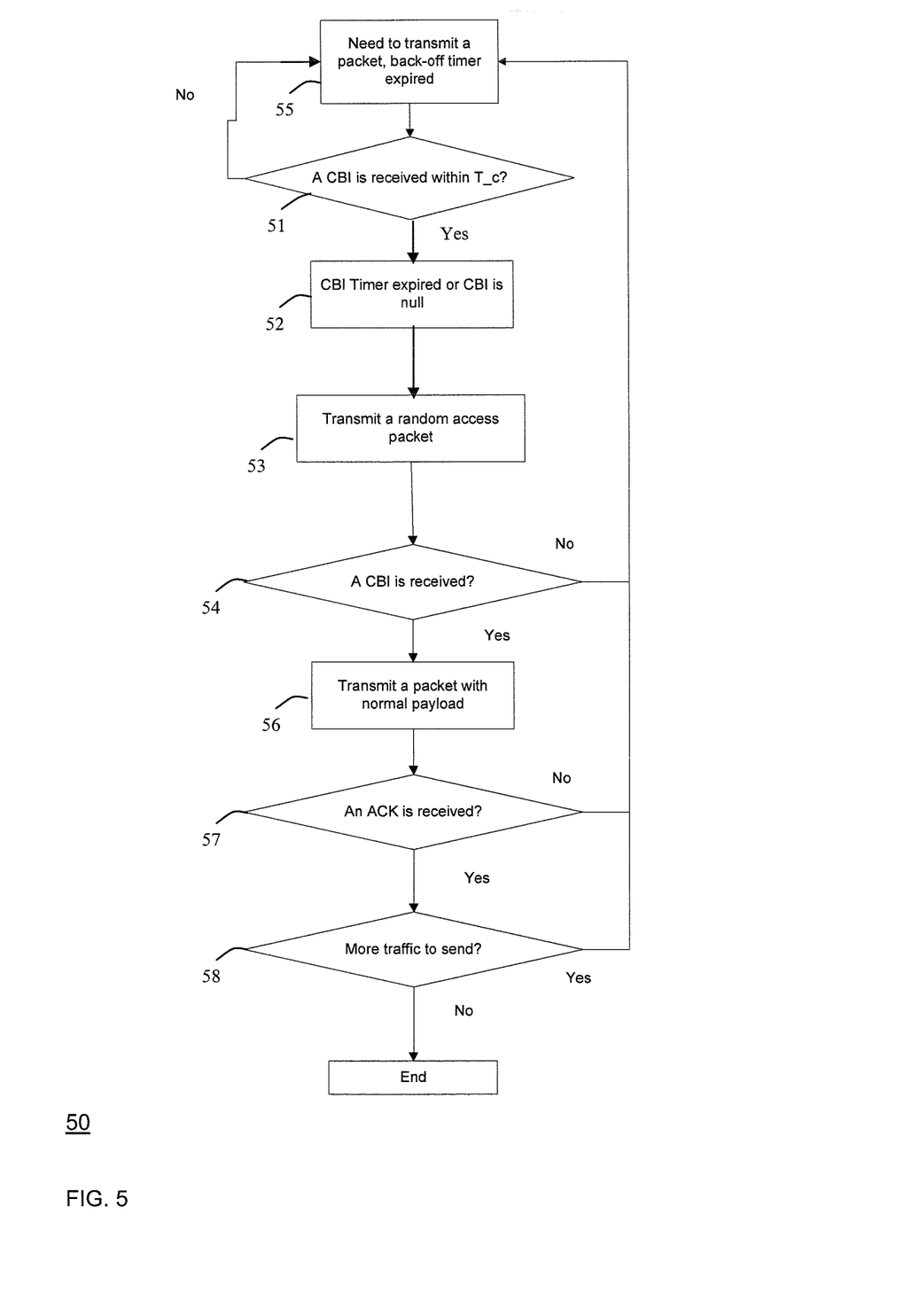
FIG. 5 shows a random access process implemented by a requesting station in a wireless network, according to an embodiment of the invention.

FIG. 5 shows a channel random access process 50 for a station, according to an embodiment of the invention. In block 51, a requesting station attempts to detect a CBI first. In block 52, if a CBI is detected, then the station waits for the reserved time period in the CBI (CBI timer) to expire to proceed to block 53 (if the CBI is NULL, then the station proceeds to block 53 without delay). In block 53, the station desiring to transmit data, first transmits a random access packet after the detected CBI.

If the coordinator receives the random access request packet successfully, the coordinator broadcast a CBI. All other stations refrain from contending the channel, but set the CBI timer for a time period indicated in the CBI packet, and wait for it to expire. As such, in block 54, after transmission of the random access packet, the requesting station detects if a CBI is received from the coordinator, indicating a reserved time period for the station. If a CBI is not received, the process proceeds to block 55 to back off until the timer expires and transmits again later, otherwise the process proceeds to block 56 to transmit a data packet on the channel to the coordinator with a normal payload during a reserved time period indicated by the received CBI. The data packet includes MAC commands, such as association commands, bandwidth request commands, and audio video application data packets, etc.

After the coordinator receives the MAC packet successfully, the coordinator transmits an ACK to the requesting station. As such, in block 57, the station detects if an ACK is received from the coordinator. If not, the process proceeds to block 55, otherwise in block 58 it is determined if the station has more data to transmit. If yes, the process proceeds to block 55.

Figure 6:
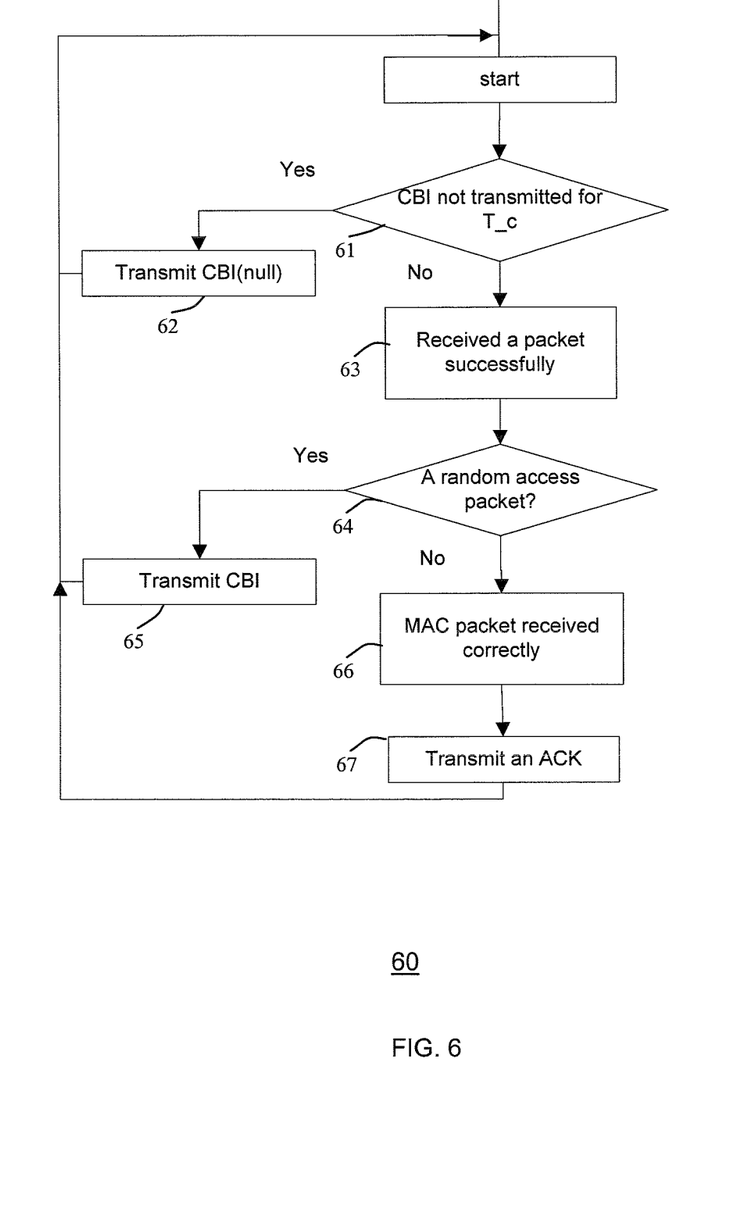
FIG. 6 shows a random access process implemented by a coordinator in a wireless network, according to an embodiment of the invention.

FIG. 6 shows an example coordinator random access process 60, corresponding to the station random access process 50, according to an embodiment of the invention. In block 61, the coordinator determines if it has not transmitted a CBI for T_c period. If a CBI has not been transmitted, then in block 62 the coordinator transmits a CBI with duration indication as null and proceeds to block 61. Otherwise, in block 63 the coordinator detects reception of a packet. In block 64, the coordinator detects if the received packet is a random access packet from a requesting station which desires a reserved period for transmitting a data packet on the shared channel. If yes, then in block 65 the coordinator generates a CBI indicating a reservation period requested by the random access packet and transmits the CBI to all the stations, then proceeds to block 61. If the received packet is not a random access packet (e.g., it is a MAC data packet), then in block 66 the coordinator detects that the data packet is correctly received. Then in block 67 the coordinator transmits an ACK for the received packet and proceeds to block 61.

This provides a channel access scheme that is suitable for a wireless network with wireless stations that transmit directionally, but may be applied to other wireless networks as well. Carrier sensing is not required nor used. Each random access request packet is wirelessly transmitted from a requesting station at the beginning of each slot. Such a random access request packet is transmitted directionally from the requesting station to the coordinator. A response packet (e.g., CBI packet) from the coordinator is transmitted immediately following the successful reception of a random access request packet. The response packet is wirelessly broadcast by the coordinator (e.g., omni-directionally or pseudo-omni-directionally) to a wider range of stations than the requesting station.

In one implementation, the stations only set NAV (Network Allocation Vector) after receiving the response packet from the coordinator. This is because if DCF (Distributed Coordination Function) as in IEEE 802.11 is utilized with directional transmission, a RTS (Request To Send) may collide with a CTS (Clear To Send) because certain stations may not implement carrier sensing and falsely backoff or miss the CTS, then interfering with the data transmissions. The invention is useful in wireless networks implementing NGmS, IEEE 802.11 VHT, IEEE 802.15.3c and others.

Figure 7:
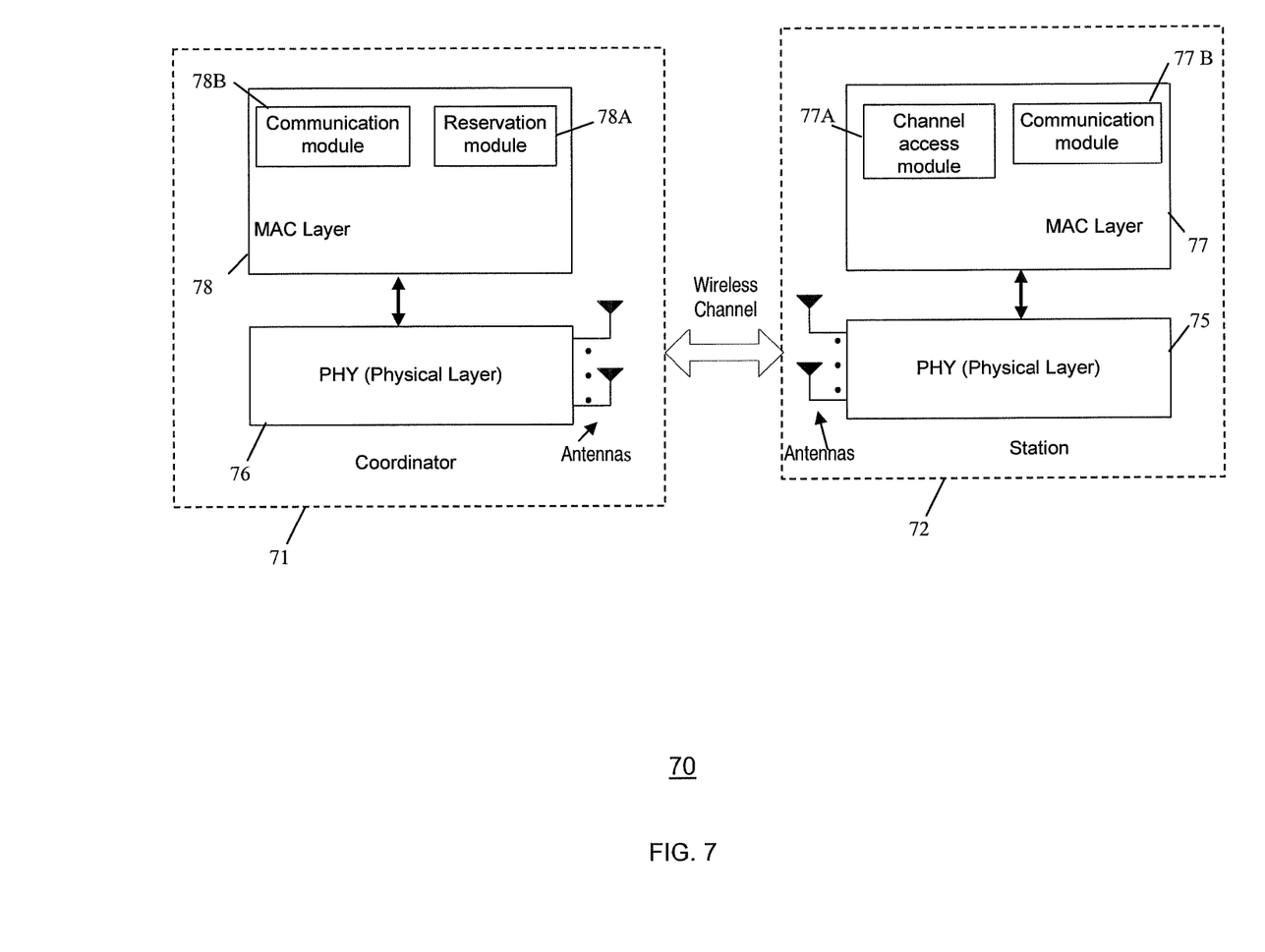
FIG. 7 shows a block diagram of architecture of wireless stations implementing random access to a shared wireless channel, according to an embodiment of the present invention.

FIG. 7 shows a block diagram of architecture for an example wireless system/network 70 implementing random access to a shared channel, according to the present invention. The network 70 includes a coordinator 71 (e.g., $Dev_N$ in FIG. 1) and one or more requesting stations 72 (e.g., $Dev_1, \ldots, Dev_{N-1}$ in FIG. 1). The coordinator 71 includes a PHY layer 76 and a MAC layer 78. The MAC layer 78 implements a reservation module 78A and a communication module 78B. The station 72 includes a PHY layer 75 and a MAC layer 77. The MAC layer 77 implements a random access module 77A and a communication module 77B. Each PHY layer 75, 76, may comprise one or multiple antennas. In this example, the random access module 77A implements the station process shown in FIG. 5 and the reservation module 78A implements the coordinator function shown in FIG. 6, described above. The communication modules 78B, 77B enable the coordinator 71 and station 72 to communicate over a shared wireless channel via the PHY layers (e.g., sending and receiving packets, etc.).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc. Further, embodiments of the invention can take the form of an entirely hardware embodiment, an entirely software embodiment or an embodiment containing both hardware and software elements.

The terms "computer program medium," "computer usable medium", "computer readable medium", and "computer program product", are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication in a wireless network, comprising:
directionally transmitting a request for access to a wireless communication channel by a wireless station during a random access period; and
in response to the request, reserving a channel time period for data transmission by the requesting wireless station, and pseudo-omni-directionally broadcasting a packet to all other wireless stations in the network to indicate the reservation, wherein said packet comprises a Channel Busy Indication (CBI) packet broadcast for virtual sensing by all of the other wireless stations in the network to indicate the time duration the channel is reserved for the requesting wireless station,
wherein directional transmission is used where carrier sensing is not available to all of the wireless stations.

2. The method of claim 1 wherein said request comprises a request packet of a fixed-size that is transmitted directionally to the coordinator using random access transmission.

3. The method of claim 2 wherein the request packet includes a field indicating the length of the desired reservation period.

4. The method of claim 1 further including:
upon receiving a CBI packet, stations other than a coordinator and the requesting station refraining from accessing the channel for the duration of a reservation period reserved for the requesting wireless station.

5. The method of claim 1 further comprising dividing the channel time into contention time slots, wherein each slot comprises an amount of time for transmitting a random access packet and a CBI.

6. The method of claim 1 further including the coordinator transmitting null CBI packets if no CBI is transmitted for a time period, allowing a wireless station joining the network to detect a coordinator and synchronize with the network.

7. The method of claim 1 further including: upon successfully receiving the packet from a coordinator, the wireless station directionally transmitting a Medium Access Control (MAC) packet during the duration of the time period specified by the coordinator.

8. The method of claim 7 wherein the length of the reservation period is selected below a threshold to allow fairness in access to the channel by other wireless stations.

9. The method of claim 7 further including: the coordinator replying to the MAC packet with an acknowledgement (ACK) upon successful reception.

10. A system for wireless communication in a wireless network, comprising:
a wireless coordinator; and
a wireless station configured for directionally transmitting a request to the coordinator for random access to a communication channel;
wherein upon the coordinator successfully receiving the request from the wireless station, the coordinator reserves a channel time period for data transmission by the requesting wireless station, and at least pseudo-omni-directionally broadcasts a packet to all wireless stations in the network indicating the reservation,
wherein said packet comprises a Channel Busy Indication (CBI) packet broadcast by the coordinator for providing virtual sensing to all of the wireless stations in the network indicating the time duration the channel is reserved for the requesting wireless station,
wherein directional transmission is used where carrier sensing is not available to all of the wireless stations.

11. The system of claim 10 wherein said request comprises a request packet of a fixed-size that is transmitted directionally to the coordinator using random access transmission.

12. The system of claim 10 wherein the coordinator is further configured for dividing the channel time into contention time slots, wherein each slot is long enough to transmit a random access packet and a CBI.

13. The system of claim 12 wherein the request packet includes a field indicating the length of the desired reservation period.

14. The system of claim 13 wherein upon receiving a CBI packet, stations other than the coordinator and the requesting station refraining from accessing the channel for the duration of a reservation period reserved for the requesting wireless station.

15. The system of claim 10 wherein the coordinator transmits null CBI packets if no CBI is transmitted for a time period, allowing a wireless station joining the network to detect the coordinator and synchronize with the network.

16. The system of claim 10 wherein upon the wireless station successfully receiving the packet from the coordinator, the wireless station directionally transmits a Medium Access Control (MAC) packet during the duration of the time period specified by the coordinator.

17. The system of claim 16 wherein the coordinator replies to the MAC packet with an acknowledgement (ACK) upon successful reception.

18. The system of claim 16 wherein the length of the reservation period is selected below a threshold to allow fairness in access to the channel by other wireless stations.

19. A wireless coordinator for communication in a wireless network, comprising:
a communication module for data communication with one or more wireless stations in the network; and
a reservation module, wherein upon the communication module successfully receiving a channel random access request from a wireless station, the reservation module reserves a channel time period for data transmission by the requesting wireless station, and at least pseudo-omni-directionally broadcasts a packet to all wireless stations in the network indicating the reservation,
wherein said packet comprises a Channel Busy Indication (CBI) packet broadcast by the coordinator for providing virtual sensing to all of the wireless stations in the network indicating the time duration the channel is reserved for the requesting wireless station, wherein directional transmission is used where carrier sensing is not available to all of the wireless stations.

20. The coordinator of claim 19 wherein said request comprises a request packet of a fixed-size that is transmitted directionally to the coordinator using random access transmission.

21. The coordinator of claim 19 wherein the reservation module divides the channel time into contention time slots, wherein each slot is long enough to transmit a random access packet and a CBI.

22. The coordinator of claim 21 wherein the reservation module transmits null CBI packets if no CBI is transmitted for a time period, allowing a wireless station joining the network to detect the coordinator and synchronize with the network.

23. The coordinator of claim 19 wherein upon successfully receiving the packet from the coordinator, the wireless station directionally transmits a Medium Access Control (MAC) packet for duration of the time period specified by the coordinator.

24. The coordinator of claim 23 wherein the coordinator replies to the MAC packet with an acknowledgement (ACK) upon successful reception.

25. The coordinator of claim 23 wherein the length of the reservation period is selected below a threshold to allow fairness in access to the channel by other wireless stations.

26. The coordinator of claim 19 wherein the request packet includes a field indicating the length of the desired reservation period.

27. The coordinator of claim 26 wherein upon receiving a CBI packet, stations other than the coordinator and the requesting station refraining from accessing the channel for the duration of a reservation period reserved for the requesting wireless station.

28. The method of claim 1, wherein the coordinator omni-directionally broadcasting the packet at all directions to all wireless stations in the network indicating the reservation.

29. The method of claim 1, wherein the coordinator directionally broadcasts the packet to all wireless stations in the network indicating the reservation.

30. The method of claim 1, wherein the CBI packet is broadcast by the coordinator for providing virtual sensing to the wireless stations without using carrier sensing.

31. The method of claim 30, wherein directional transmission is used where carrier sensing is not available to all of the wireless stations.

32. The method of claim 1, further comprising receiving an acknowledgement (ACK) by the requesting wireless station upon successful reception of a random access packet, wherein all other wireless stations in the network defer transmissions during the reserved channel time period, and after expiration of the reserved time period, another random access period begins.

33. The method of claim 32, wherein after the reserved channel time period expires, another random access period begins.

34. The method of claim 32, wherein all of the other wireless stations in the network set a CBI timer for a time period indicated in the CBI packet, and wait for the CBI timer to expire before transmitting packets.

35. The method of claim 1, wherein a coordinator transmits and receives at a wider range than the wireless stations in the network.

36. A method of wireless communication in a wireless network, comprising:
   directionally transmitting a request for access to a wireless communication channel by a wireless station during a random access period; and
   in response to the request, reserving a channel for a time period for data transmission by the requesting wireless station, and pseudo-omni-directionally broadcasting a packet on the wireless communication channel to indicate the reservation, wherein said packet comprises a Channel Busy Indication (CBI) packet for virtual sensing by other wireless stations to determine the time duration the wireless communication channel is reserved for the requesting wireless station,
   wherein directional transmission is used where carrier sensing is not available to all of the wireless stations.

37. The method of claim 36, wherein the CBI packet is broadcast for virtual sensing by all of the wireless stations in the network without using carrier sensing.

38. The method of claim 1, wherein the request packet includes a Medium Access Control (MAC) layer header including a field indicating the length of the desired reservation period.

39. The method of claim 38, wherein the desired reservation period comprises length of time for a requesting station to transmit a following data packet and acknowledgement (ACK) sequence.

40. The method of claim 38, wherein the request packet further includes a preamble and a physical layer header.

* * * * *